US012772257B2

(12) United States Patent
Ratasuk et al.

(10) Patent No.: US 12,772,257 B2
(45) Date of Patent: Oct. 20, 2026

(54) FREQUENCY DOMAIN RESOURCE SET INDICATION FOR REDCAP UE

(71) Applicant: Nokia Technologies Oy, Espoo (FI)

(72) Inventors: Rapeepat Ratasuk, Naperville, IL (US); Nitin Mangalvedhe, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 268 days.

(21) Appl. No.: 18/486,410

(22) Filed: Oct. 13, 2023

(65) Prior Publication Data

US 2024/0155642 A1 May 9, 2024

Related U.S. Application Data

(60) Provisional application No. 63/422,228, filed on Nov. 3, 2022.

(51) Int. Cl.

*H04W 72/232* (2023.01)
*H04W 72/0453* (2023.01)
*H04W 72/51* (2023.01)

(52) U.S. Cl.

CPC ..... *H04W 72/232* (2023.01); *H04W 72/0453* (2013.01); *H04W 72/51* (2023.01)

(58) Field of Classification Search

CPC ........... H04W 72/232; H04W 72/0453; H04W 72/51; H04W 72/23; H04W 4/70; H04L 5/0053

See application file for complete search history.

(56) References Cited

U.S. PATENT DOCUMENTS 11,039,423 B2 6/2021 Song et al.
12,396,036 B2 * 8/2025 Lei ........................ H04W 72/51

(Continued)

FOREIGN PATENT DOCUMENTS

WO 2021/109915 A1 6/2021
WO 2022/133357 A1 6/2022

OTHER PUBLICATIONS

"3rd Generation Partnership Project; Technical Specification Group Radio Access Network; NR; Physical layer procedures for data (Release 17)", 3GPP TS 38.214, V17.3.0, Sep. 2022, pp. 1-233.

(Continued)

*Primary Examiner* — Brian T O Connor

(74) *Attorney, Agent, or Firm* — Harness, Dickey & Pierce, P.L.C.

(57) ABSTRACT

In a system, apparatus, method, and non-transitory computer readable medium related to for providing a frequency domain resource set indication for reduced capability user equipment (UE), a radio access network node is caused to, determine whether to provide enhanced messages to a UE device via at least one enhanced physical resource block (PRB) based on a network setting, provide a resource set indication to the UE device based on results of the determining, the resource set indication indicating a set of physical resource blocks which are to be enhanced, transmit downlink control information (DCI) to the UE device, the DCI including a frequency domain resource allocation indication indicating a plurality of physical resource blocks assigned to at least one desired message, and transmit the at least one desired message to the UE device based on the frequency domain resource allocation indication.

20 Claims, 7 Drawing Sheets

(56) References Cited

U.S. PATENT DOCUMENTS

| | | | | |
|---|---|---|---|---|
| 12,418,899 | B2 * | 9/2025 | Liu | H04L 1/1614 |
| 2021/0314956 | A1 | 10/2021 | Khoshnevisan et al. | |
| 2021/0321400 | A1 * | 10/2021 | Takeda | H04L 5/0094 |
| 2022/0053466 | A1 | 2/2022 | Taherzadeh Boroujeni et al. | |
| 2022/0159686 | A1 * | 5/2022 | Shin | H04L 5/0094 |
| 2022/0210806 | A1 * | 6/2022 | Rastegardoost | H04B 7/0628 |
| 2024/0032103 | A1 * | 1/2024 | Rastegardoost | H04W 74/0833 |
| 2025/0142566 | A1 * | 5/2025 | Li | H04W 72/51 |
| 2025/0167961 | A1 * | 5/2025 | He | H04W 24/08 |
| 2025/0176003 | A1 * | 5/2025 | Liu | H04W 72/51 |
| 2026/0136341 | A1 * | 5/2026 | Xiong | H04L 5/0007 |

OTHER PUBLICATIONS

"New WID on enhanced support of reduced capability NR devices", 3GPP TSG RAN Meeting #97-e, RP-222675, Agenda Item: 9.1.1. Ericsson, Sep. 12-16, 2022, 5 pages.

"3rd Generation Partnership Project; Technical Specification Group Radio Access Network; Study on further NR RedCap UE complexity reduction (Release 18)", 3GPP TR 38.865, V18.0.0, Sep. 2022, pp. 1-52.

"3rd Generation Partnership Project; Technical Specification Group Radio Access Network; NR; Physical layer procedures for control (Release 17)", 3GPP TS 38.213, V17.3.0, Sep. 2022, pp. 1-260.

Micheli et al., "Power Boosting and Compensation During OTA Testing of a Real 4G LTE Base Station in Reverberation Chamber", IEEE Transactions on Electromagnetic Compatibility, vol. 57, No. 4, Aug. 2015, pp. 623-634.

"Discussion on further UE complexity reduction for eRedCap", 3GPP TSG RAN WG1 Meeting #110bis-e, R1-2209451, Agenda Item: 9.6.1, LG Electronics, Oct. 10-19, 2022, 11 pages.

"UE Complexity Reduction for eRedCap", 3GPP TSG RAN WG1 Meeting #110bis-e, R1-2209995, Agenda Item: 9.6.1, Qualcomm Incorporated, Oct. 10-19, 2022, 14 pages.

"Further RedCap UE complexity reduction", 3GPP TSG-RAN WG1 Meeting #110bis-e, R1-2208362, Agenda Item: 9.6.1, Ericsson, Oct. 10-19, 2022, pp. 1-12.

"Discussion on complexity reduction for eRedCap UE", 3GPP TSG RAN WG1 Meeting #110b-e, R1-2209062, Agenda item: 9.6.1, Intel Corporation, Oct. 10-19, 2022, pp. 1-8.

"Discussion on UE complexity reduction", 3GPP TSG RAN WG1 #110bis-e, R1-2209170, Agenda item: 9.6.1, Transsion Holdings, Oct. 10-19, 2022, 4 pages.

"RedCap UE Complexity Reduction", 3GPP TSG RAN WG1 Meeting #111, R1-2211759, Agenda item: 9.6.1, Nokia, Nov. 14-18, 2022, 10 pages.

Extended European Search Report received for corresponding European Patent Application No. 23204536.9, dated Mar. 12, 2024, 11 pages.

"Discussion on potential solutions for further UE complexity reduction", 3GPP TSG RAN WG1 Meeting #110, R1-2207036, Agenda item: 9.6.1, LG Electronics, Aug. 22-26, 2022, 14 pages.

"Evaluation of coverage impact for eRedCap", 3GPP TSG RAN WG1 #110, R1-2206437, Agenda item: 9.6.2, Panasonic, Aug. 22-26, 2022, 9 pages.

* cited by examiner

FREQUENCY DOMAIN RESOURCE SET INDICATION FOR REDCAP UE

BACKGROUND

Field

Various example embodiments relate to methods, apparatuses, systems, and/or non-transitory computer readable media for providing frequency domain resource set indications to reduced capability (REDCAP) user equipment (UE) devices.

Description of the Related Art

A 5$^{th}$ generation mobile network (5G) standard, referred to as 5G New Radio (NR), is being developed to provide higher capacity, higher reliability, and lower latency communications than the 4G long term evolution (LTE) standard.

The 5G NR standard provides support for reduced capability (REDCAP) UE devices operating on the 5G network. REDCAP UE devices are UE devices which may have reduced processing, hardware, memory, and/or energy capabilities in comparison to standard UE devices, and REDCAP UE devices may include industrial wireless sensors, video surveillance devices, and/or wearable smart devices, etc. Additionally, there have been proposals to provide 5G network support for REDCAP UE devices which have even further reduced capabilities.

SUMMARY

At least one example embodiment relates to a radio access network (RAN) node.

In at least one example embodiment, the node may include a memory storing computer readable instructions, and processing circuitry configured to execute the computer readable instructions to cause the node to, determine whether to provide enhanced messages to at least one user equipment (UE) device via at least one enhanced physical resource block (PRB) based on a network setting, provide a resource set indication to the at least one UE device based on results of the determining, the resource set indication indicating a set of physical resource blocks which are to be enhanced, transmit downlink control information (DCI) to the at least one UE device, the DCI including a frequency domain resource allocation indication indicating a plurality of physical resource blocks assigned to at least one desired message, and transmit the at least one desired message to the at least one UE device based on the frequency domain resource allocation indication.

Some example embodiments provide that the at least one UE device is at least one reduced capability (REDCAP) UE device, the at least one REDCAP UE device with a reduced baseband bandwidth, the reduced baseband bandwidth being smaller than a baseband bandwidth of a non-REDCAP UE device on a network corresponding to the RAN node, and the network setting indicates that the RAN node supports REDCAP UE devices with the reduced baseband bandwidth.

Some example embodiments provide that the network setting indicates that the RAN node is to increase a transmission power of the set of the plurality of the physical resource blocks which are to be enhanced by a desired boosted transmission power level.

Some example embodiments provide that the node is further caused to transmit the at least one desired message to the at least one UE device by, transmitting, at a first transmission power level, a plurality of physical resource blocks included in both the set of the plurality of the physical resource blocks which are to be enhanced and the plurality of physical resource blocks assigned to the at least one desired message, and transmitting, at a second transmission power level, a remaining subset of the plurality of physical resource blocks assigned to the at least one desired message, the first transmission power level being higher than the second transmission power level by an amount corresponding to the desired boosted transmission power level.

Some example embodiments provide that the node is further caused to transmit system information to the at least one UE device, the system information including the resource set indication.

Some example embodiments provide that the set of the plurality of the physical resource blocks which are to be enhanced are: fixed with respect to a system bandwidth, or fixed with respect to the plurality of physical resource blocks assigned to the at least one desired message.

Some example embodiments provide that the set of the plurality of physical resource blocks which are to be enhanced vary in time based on a desired frequency hopping pattern.

Some example embodiments provide that the node is further caused to perform scrambling on a cyclic redundancy check of the DCI using at least one of system information (SI)-radio network temporary identifier (RNTI), paging (P)-RNTI, random access (RA)-RNTI, or any combinations thereof.

At least one example embodiment relates to a user equipment (UE) device.

In at least one example embodiment, the device may include a memory storing computer readable instructions, and processing circuitry configured to execute the computer readable instructions to cause the device to, obtain a resource set indication from a radio access network (RAN) node, the resource set indication indicating a set of physical resource blocks which are to be enhanced, receive downlink control information (DCI) from the RAN node, the DCI including a frequency domain resource allocation indication indicating a plurality of physical resource blocks assigned to at least one desired message to be transmitted by the RAN node, and receive the at least one desired message from the RAN node based on the resource set indication and the frequency domain resource allocation indication.

Some example embodiments provide that the device is a reduced capability (REDCAP) UE device with a reduced baseband bandwidth, the reduced baseband bandwidth being smaller than a baseband bandwidth of a non-REDCAP UE device on a network corresponding to the RAN node, and a transmission power level of the set of the plurality of the physical resource blocks which are to be enhanced is increased by a desired boosted transmission power level by the RAN node.

Some example embodiments provide that the device is further caused to, determine an identity of the enhanced physical resource blocks by performing an AND operation on the resource set indication and the frequency domain resource allocation indication.

Some example embodiments provide that the device is further caused to receive system information from the RAN node, the system information including the resource set indication.

Some example embodiments provide that the set of the plurality of the physical resource blocks which are to be enhanced are: fixed with respect to a system bandwidth, or fixed with respect to the plurality of physical resource blocks assigned to the at least one desired message.

Some example embodiments provide that the set of the plurality of the physical resource blocks which are to be enhanced vary in time based on a desired frequency hopping pattern.

Some example embodiments provide that the device is further caused to receive a repeated transmission of the set of the plurality of the physical resource blocks which are to be enhanced from the RAN node.

Some example embodiments provide that the device is further caused to determine whether a cyclic redundancy check of the DCI is scrambled using at least one of system information (SI)-radio network temporary identifier (RNTI), paging (P)-RNTI, random access (RA)-RNTI, or any combinations thereof.

At least one example embodiment relates to a method of operating a radio access network (RAN) node.

In at least one example embodiment, the method may include, determining whether to provide enhanced messages to at least one user equipment (UE) device via at least one enhanced physical resource block (PRB) based on a network setting, providing a resource set indication to the at least one UE device based on results of the determining, the resource set indication indicating a set of physical resource blocks which are to be enhanced, transmitting downlink control information (DCI) to the at least one UE device, the DCI including a frequency domain resource allocation indication indicating a plurality of physical resource blocks assigned to at least one desired message, and transmitting the at least one desired message to the at least one UE device based on the frequency domain resource allocation indication.

Some example embodiments provide that the at least one UE device is at least one reduced capability (REDCAP) UE device, the at least one REDCAP UE device with a reduced baseband bandwidth, the reduced baseband bandwidth being smaller than a baseband bandwidth of a non-REDCAP UE device on a network corresponding to the RAN node, and the network setting indicates that the RAN node supports REDCAP UE devices with the reduced baseband bandwidth.

Some example embodiments provide that the RAN node is to increase a transmission power of the set of the plurality of the physical resource blocks which are to be enhanced by a desired boosted transmission power level.

At least one example embodiment relates to a radio access network (RAN) node.

In at least one example embodiment, the node may include means for, determining whether to provide enhanced messages to at least one user equipment (UE) device via at least one enhanced physical resource block (PRB) based on a network setting, providing a resource set indication to the at least one UE device based on results of the determining, the resource set indication indicating a set of physical resource blocks which are to be enhanced, transmitting downlink control information (DCI) to the at least one UE device, the DCI including a frequency domain resource allocation indication indicating a plurality of physical resource blocks assigned to at least one desired message, and transmitting the at least one desired message to the at least one UE device based on the frequency domain resource allocation indication.

Some example embodiments provide that the at least one UE device is at least one reduced capability (REDCAP) UE device, the at least one REDCAP UE device with a reduced baseband bandwidth, the reduced baseband bandwidth being smaller than a baseband bandwidth of a non-REDCAP UE device on a network corresponding to the RAN node, and the network setting indicates that the RAN node supports REDCAP UE devices with the reduced baseband bandwidth.

Some example embodiments provide that the network setting indicates that the RAN node is to increase a transmission power of the set of the plurality of the physical resource blocks which are to be enhanced by a desired boosted transmission power level.

Some example embodiments provide that the node further include means for transmitting the at least one desired message to the at least one UE device by, transmitting, at a first transmission power level, a plurality of physical resource blocks included in both the set of the plurality of the physical resource blocks which are to be enhanced and the plurality of physical resource blocks assigned to the at least one desired message, and transmitting, at a second transmission power level, a remaining subset of the plurality of physical resource blocks assigned to the at least one desired message, the first transmission power level being higher than the second transmission power level by an amount corresponding to the desired boosted transmission power level.

Some example embodiments provide that the node further include means for transmitting system information to the at least one UE device, the system information including the resource set indication.

Some example embodiments provide that the set of the plurality of the physical resource blocks which are to be enhanced are: fixed with respect to a system bandwidth, or fixed with respect to the plurality of physical resource blocks assigned to the at least one desired message.

Some example embodiments provide that the set of the plurality of physical resource blocks which are to be enhanced vary in time based on a desired frequency hopping pattern.

Some example embodiments provide that the node further include means for repeating transmission of set of the plurality of the physical resource blocks which are to be enhanced to the at least one UE device.

Some example embodiments provide that the node further include means for performing scrambling on a cyclic redundancy check of the DCI using at least one of system information (SI)-radio network temporary identifier (RNTI), paging (P)-RNTI, random access (RA)-RNTI, or any combinations thereof.

At least one example embodiment relates to a user equipment (UE) device.

In at least one example embodiment, the device may include means for, obtaining a resource set indication from a radio access network (RAN) node, the resource set indication indicating a set of physical resource blocks which are to be enhanced, receiving downlink control information (DCI) from the RAN node, the DCI including a frequency domain resource allocation indication indicating a plurality of physical resource blocks assigned to at least one desired message to be transmitted by the RAN node, and receiving the at least one desired message from the RAN node based on the resource set indication and the frequency domain resource allocation indication.

Some example embodiments provide that the device is a reduced capability (REDCAP) UE device with a reduced baseband bandwidth, the reduced baseband bandwidth being smaller than a baseband bandwidth of a non-REDCAP UE device on a network corresponding to the RAN node, and a transmission power level of the set of the plurality of the physical resource blocks which are to be enhanced is increased by a desired boosted transmission power level by the RAN node.

Some example embodiments provide that the device further includes means for determining an identity of the enhanced physical resource blocks by performing an AND operation on the resource set indication and the frequency domain resource allocation indication.

Some example embodiments provide that the device further includes means for receiving system information from the RAN node, the system information including the resource set indication.

Some example embodiments provide that the set of the plurality of the physical resource blocks which are to be enhanced are: fixed with respect to a system bandwidth, or fixed with respect to the plurality of physical resource blocks assigned to the at least one desired message.

Some example embodiments provide that the set of the plurality of the physical resource blocks which are to be enhanced vary in time based on a desired frequency hopping pattern.

Some example embodiments provide that the device further includes means for receiving a repeated transmission of the set of the plurality of the physical resource blocks which are to be enhanced from the RAN node.

Some example embodiments provide that the device further includes means for determining whether a cyclic redundancy check of the DCI is scrambled using at least one of system information (SI)-radio network temporary identifier (RNTI), paging (P)-RNTI, random access (RA)-RNTI, or any combinations thereof.

BRIEF DESCRIPTION OF THE DRAWINGS

The accompanying drawings, which are incorporated in and constitute a part of the specification, illustrate one or more example embodiments and, together with the description, explain these example embodiments. In the drawings.

DETAILED DESCRIPTION

Figure 1:
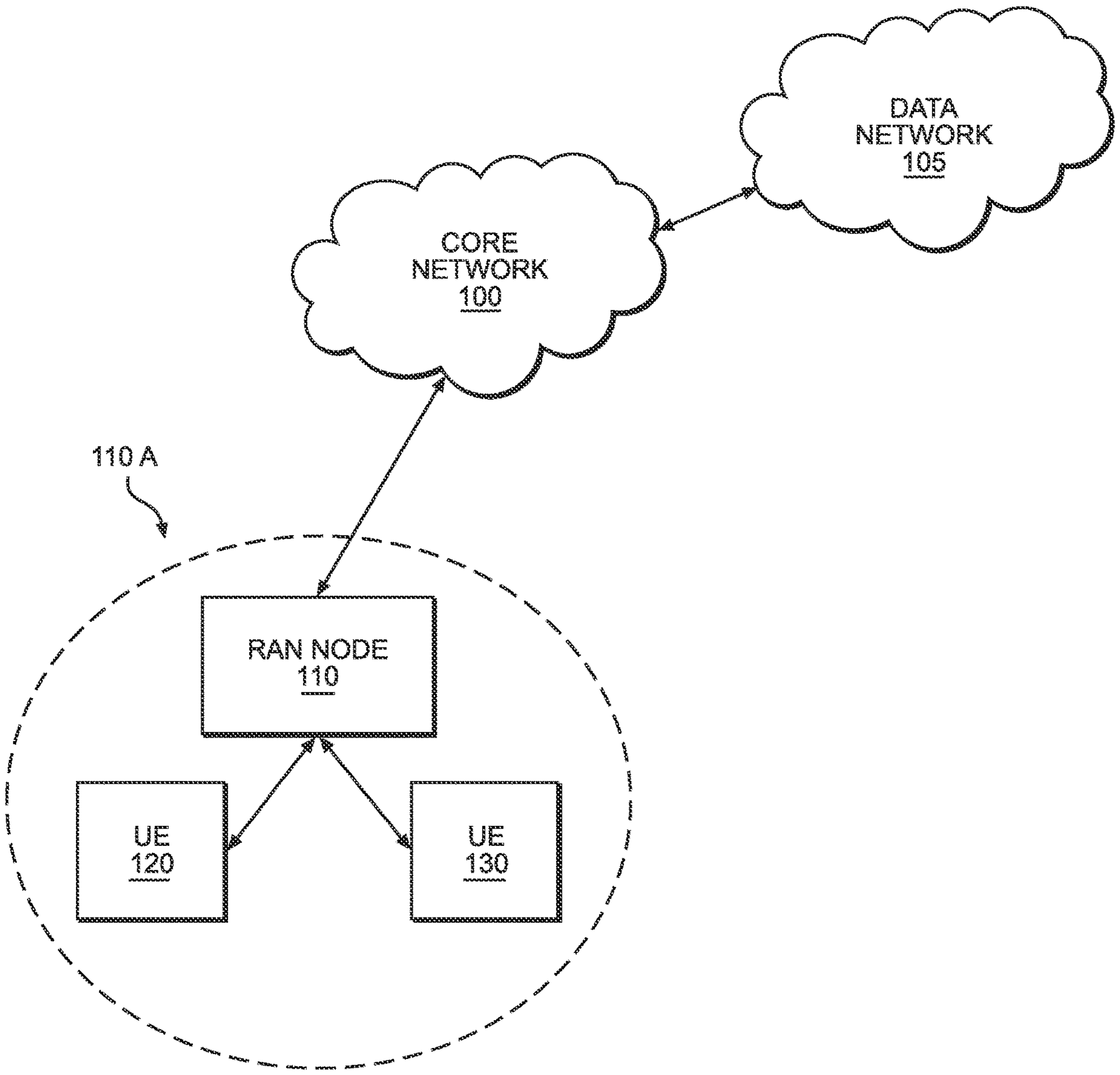
FIG. 1 illustrates an example wireless communication system according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

While the various example embodiments of the present disclosure are discussed in connection with the 5G wireless communication standard for the sake of clarity and convenience, the example embodiments are not limited thereto, and one of ordinary skill in the art would recognize the example embodiments may be applicable to other wireless communication standards, such as the 4G standard, a Wi-Fi standard, a future 6G standard, a future 7G standard, etc.

Various example embodiments are directed towards providing enhancements to the network support provided for REDCAP UE devices and/or further reduced capability REDCAP UE devices (e.g., reduced baseband bandwidth REDCAP UE devices, etc.). More specifically, the various example embodiments provide network support for REDCAP UE devices which have reduced baseband bandwidth in comparison to standard UE devices and/or standard REDCAP UE devices, etc., by transmitting enhanced signaling and/or enhanced messages from the wireless network to improve the physical downlink data channel (PDSCH) performance of the reduced baseband bandwidth UE device while being fully compatible with and/or without decreasing the link-level performance of standard UE devices and/or standard REDCAP UE devices, etc. In some example embodiments, the enhanced signaling and/or enhanced messages may be power boosted in a desired frequency range supported by the reduced baseband bandwidth REDCAP UE devices within the baseband bandwidth allocated to all UE devices, thereby increasing the link level performance of the reduced baseband bandwidth REDCAP UE devices, while maintaining support for standard UE devices and/or standard REDCAP UE devices without link level performance loss for the standard UE devices and/or standard REDCAP UE devices, but the example embodiments are not limited thereto.

FIG. 1 illustrates an example wireless communication system according to at least one example embodiment. As shown in FIG. 1, a wireless communication system includes a core network 100, and a Data Network 105, a radio access network (RAN) node 110, a first user equipment device (e.g., UE device or UE, etc.) 120, and/or a second UE device 130, etc., but the example embodiments are not limited thereto and the example embodiments may include a greater or lesser number of constituent elements. For example, the wireless communication system may include two or more RAN nodes, one UE device, three or more UE devices, additional base stations, servers, routers, access points, gateways, etc.

The RAN node 110, the UE device 120 and/or the UE device 130 may be connected over a wireless network, such as a cellular wireless access network (e.g., a 3G wireless access network, a 4G-Long Term Evolution (LTE) network, a 5G-New Radio (e.g., 5G) wireless network, a 6G wireless network, a WiFi network, etc.). The wireless network may include a core network 100 and/or a Data Network 105. The RAN node 110 may connect to other RAN nodes (not shown), as well as to the core network 100 and/or the Data Network 105, over a wired and/or wireless network. The core network 100 and the Data Network 105 may connect to each other over a wired and/or wireless network. The Data Network 105 may refer to the Internet, an intranet, a wide area network, etc.

According to some example embodiments, the RAN node 110 may act as a relay node (e.g., an integrated access and backhaul (IAB) node) and may communicate with the UE devices 120 and/or 130, etc., in combination with at least one base station (and/or access point (AP), router, etc.) (not shown) of the same or a different radio access technology (e.g., WiFi, etc.).

The UE devices 120, 130, etc., may be any one of, but not limited to, a mobile device, a smartphone, a tablet, a laptop computer, a wearable device, an Internet of Things (IoT) device, a sensor (e.g., thermometers, humidity sensors, pressure sensors, motion sensors, accelerometers, etc.), actuators, robotic devices, robotics, drones, connected medical devices, eHealth devices, smart city related devices, a security camera, autonomous devices (e.g., autonomous cars, etc.), a desktop computer and/or any other type of stationary or portable device capable of operating according to, for example, the 5G NR communication standard, and/or other wireless communication standard(s). The UE devices 120, 130, etc., may be configurable to transmit and/or receive data in accordance to strict latency, reliability, and/or accuracy requirements, such as DRX communications, URLLC communications, TSC communications, etc., but the example embodiments are not limited thereto.

According to at least one example embodiment, the UE devices 120, 130, etc., may be reduced capability (REDCAP) UE devices. According to some example embodiments, the REDCAP UE devices may have a reduced baseband bandwidth (reduced BBBW) for PDSCH (e.g., unicast and/or broadcast messages) and/or for physical uplink channel (PUSCH) in comparison to non-RBBBW REDCAP UE devices and/or standard, non-REDCAP UE devices supported by the RAN node 110, but the example embodiments are not limited thereto. In some example embodiments, the REDCAP UE devices may be further configured to use a larger RF bandwidth for data transmissions (e.g., UL and/or DL transmissions), etc. For example, the RBBBW REDCAP UE devices (e.g. a REDCAP Type 2 UE, etc.) may only be able to support 5 MHz baseband bandwidth in Frequency Range 1 (FR1) for PDSCH and PUSCH transmissions in comparison to a 20 MHz baseband bandwidth for a non-RBBBW REDCAP UE device (e.g. a REDCAP Type 1 UE, etc.) or a much larger baseband bandwidth (e.g. 100 MHz) for a standard, non-REDCAP UE device, but the example embodiments are not limited thereto, and other desired values for the RBBBW and/or the standard BBBWs may be used. Moreover, the RBBBW REDCAP UE devices may be configured to use the standard REDCAP BBBW for UL and/or DL transmission, etc., but the example embodiments are not limited thereto.

According to some example embodiments, the UE devices 120, 130, etc. may also be energy harvesting REDCAP UE devices (e.g., EH REDCAP UE devices, etc.) and may be configured to harvest energy using EH devices, apparatuses, and/or means, such as solar cells/panels, wind turbines, water turbines, heat pumps, geothermal heat pumps, kinetic energy harvesting devices and/or vibration harvesting devices, radio frequency harvesting devices, etc., but the example embodiments are not limited thereto. According to at least one example embodiment, EH REDCAP UE devices may harvest (e.g., obtain, etc.) energy from the at least one EH harvesting device included in, connected to, and/or attached to the UE device, and the EH REDCAP UE device 120, 130, etc., may store the harvested energy in at least one energy storage device (e.g., a battery, etc.) included in, connected to, and/or associated with the UE device, etc., but the example embodiments are not limited thereto.

The wireless communication system further includes at least one RAN node (e.g., a base station, a wireless access point, etc.), such as RAN node 110, etc. The RAN node 110, etc., may operate according to an underlying cellular and/or wireless radio access technology (RAT), such as 5G NR, LTE, Wi-Fi, etc. For example, the RAN node 110 may be a 5G gNB node, a LTE eNB node, or a LTE ng-eNB node, etc., but the example embodiments are not limited thereto. The RAN node 110 may provide wireless network services to one or more UE devices within one or more cells (e.g., cell service areas, broadcast areas, serving areas, coverage areas, etc.) surrounding the respective physical location of the RAN node, such as a cell 110A surrounding the RAN node 110, etc.

For example, UE devices 120, 130, etc., are located within the cell service area 110A, and may connect to, receive broadcast messages from, receive paging messages from, receive/transmit signaling messages from/to, and/or access the wireless network through, etc., RAN node 110 (e.g., the source RAN node serving the UE device, etc.), but the example embodiments are not limited thereto. According to some example embodiments, the RAN node 110 may transmit enhanced messages and/or enhanced broadcast messages to the UE devices 120, 130, etc. For example, at least one enhanced physical resource block (PRB) included in the transmitted enhanced messages and/or enhanced broadcast messages may be power boosted in a desired frequency range by the RAN node 110, but the example embodiments are not limited thereto. Moreover, the RAN node 110 may provide a resource set indication (e.g., an enhancement indication, etc.) to the UE devices 120, 130, etc., indicating the set of PRBs (e.g., the frequency range allocation, etc.) which are to be enhanced and/or power-boosted by the RAN node 110, etc. The resource set indication and the transmission of enhanced messages will be discussed in greater detail in connection with FIGS. 4 and 6A to 6D.

While FIG. 1 illustrates a single cell for the RAN node 110, the example embodiments are not limited thereto, and for example, the RAN node may provide a plurality of cells, etc.

Additionally, the RAN node 110 may be configured to operate in a multi-user (MU) multiple input multiple out (MIMO) mode and/or a massive MIMO (mMIMO) mode, wherein the RAN node 110 transmits a plurality of beams (e.g., radio channels, data streams, streams, etc.) in different spatial domains and/or frequency domains using a plurality of antennas (e.g., antenna panels, antenna elements, an antenna array, etc.) and beamforming and/or beamsteering techniques.

The RAN node 110 may be connected to at least one core network element (not shown) residing on the core network 100, such as a core network device, a core network server, access points, switches, routers, nodes, etc., but the example embodiments are not limited thereto. The core network 100 may provide network functions, such as an access and mobility management function (AMF), a session management function (SMF), a policy control function (PCF), a unified data management (UDM), a user plane function (UPF), an authentication server function (AUSF), an application function (AF), and/or a network slice selection function (NSSF), etc., and/or equivalent functions, but the example embodiments are not limited thereto.

While certain components of a wireless communication network are shown as part of the wireless communication system of FIG. 1, the example embodiments are not limited thereto, and the wireless communication network may include components other than that shown in FIG. 1, which are desired, necessary, and/or beneficial for operation of the underlying networks within the wireless communication system, such as access points, switches, routers, nodes, servers, gateways, etc.

Figure 2:
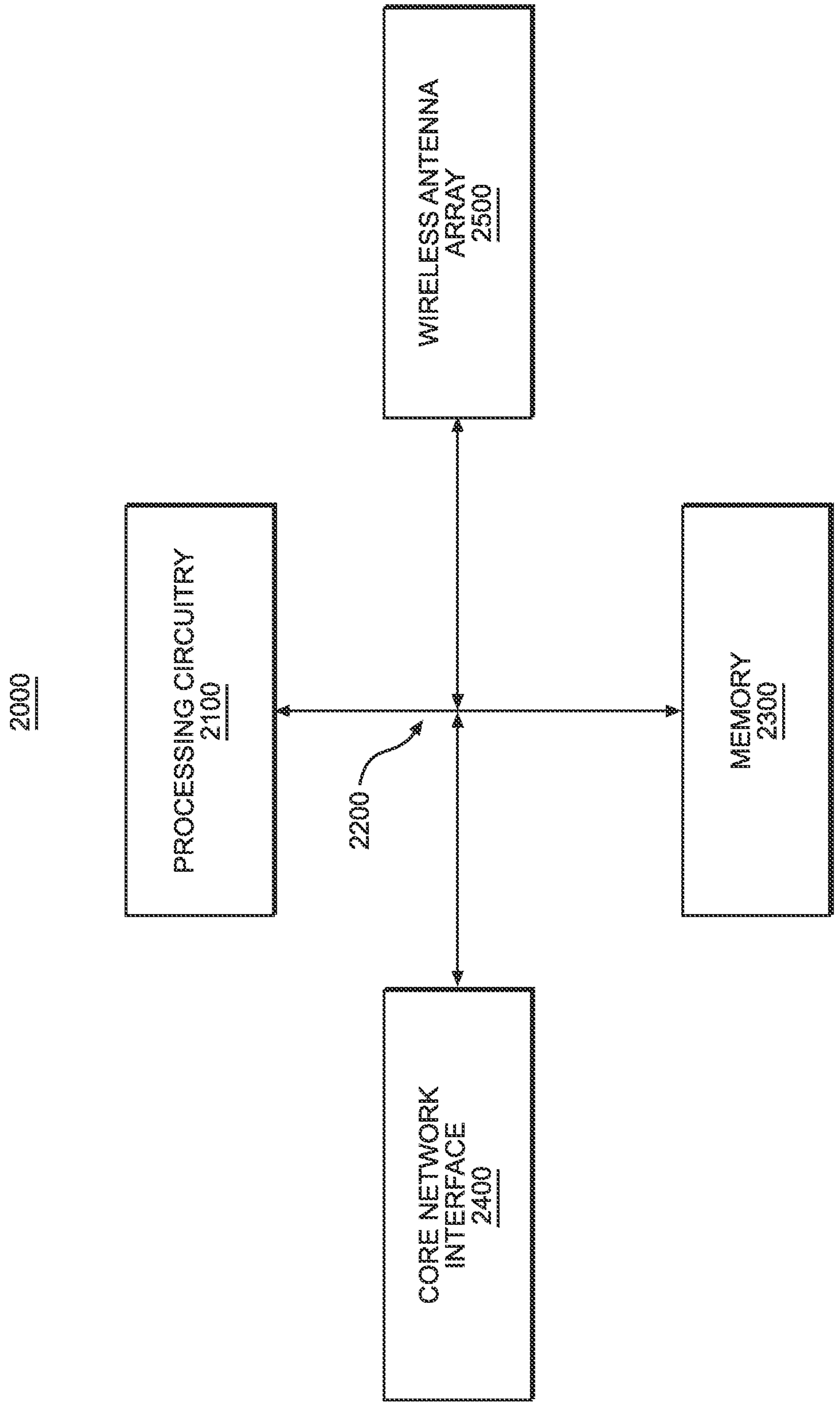
FIG. 2 illustrates a block diagram of an example RAN node according to at least one example embodiment.

FIG. 2 illustrates a block diagram of an example RAN node according to at least one example embodiment. The RAN node of FIG. 2 may correspond to the RAN node 110 of FIG. 1, but the example embodiments are not limited thereto.

Referring to FIG. 2, a RAN node 2000 may include processing circuitry, such as at least one processor 2100, at least one communication bus 2200, a memory 2300, at least one core network interface 2400, and/or at least one wireless antenna array 2500, etc., but the example embodiments are not limited thereto. For example, the core network interface 2400 and the wireless antenna array 2500 may be combined into a single network interface, etc., or the RAN node 2000 may include a plurality of wireless antenna arrays, a plurality of core network interfaces, etc., and/or any combinations thereof. The memory 2300 may include various special purpose program code including computer executable instructions which may cause the RAN node 2000 to perform the one or more of the methods of the example embodiments.

In at least one example embodiment, the processing circuitry may include at least one processor (and/or processor cores, distributed processors, networked processors, etc.), such as the at least one processor 2100, which may be configured to control one or more elements of the RAN node 2000, and thereby cause the RAN node 2000 to perform various operations. The processing circuitry (e.g., the at least one processor 2100, etc.) is configured to execute processes by retrieving program code (e.g., computer readable instructions) and data from the memory 2300 to process them, thereby executing special purpose control and functions of the entire RAN node 2000. Once the special purpose program instructions are loaded into, (e.g., the at least one processor 2100, etc.), the at least one processor 2100 executes the special purpose program instructions, thereby transforming the at least one processor 2100 into a special purpose processor.

In at least one example embodiment, the memory 2300 may be a non-transitory computer-readable storage medium and may include a random access memory (RAM), a read only memory (ROM), and/or a permanent mass storage device such as a disk drive, or a solid state drive. Stored in the memory 2300 is program code (i.e., computer readable instructions) related to operating the RAN node 2000, such as the methods discussed in connection with FIGS. 4 to 6D, the at least one core network interface 2400, and/or at least one wireless antenna array 2500, etc. Such software elements may be loaded from a non-transitory computer-readable storage medium independent of the memory 2300, using a drive mechanism (not shown) connected to the RAN node 2000, or via the at least one core network interface 2400, and/or at least one wireless antenna array 2500, etc.

In at least one example embodiment, the communication bus 2200 may enable communication and data transmission to be performed between elements of the RAN node 2000. The bus 2200 may be implemented using a high-speed serial bus, a parallel bus, and/or any other appropriate communication technology. According to at least one example embodiment, the RAN node 2000 may include a plurality of communication buses (not shown), such as an address bus, a data bus, etc.

The RAN node 2000 may operate as, for example, a 4G RAN node, a 5G RAN node, etc., and may be configured to schedule frequency domain resource allocations (FDRAs), e.g., physical resource blocks (PRBs), resource elements, etc., for UE devices connected to the RAN node 2000, but the example embodiments are not limited thereto, and for example, the RAN node 2000 may schedule time domain resource allocations as well.

For example, the RAN node 2000 may allocate time-frequency resources of a carrier (e.g., resource blocks with time and frequency dimensions) based on operation on the frequency domain (e.g., frequency division duplexing) and/or the time domain (e.g., time division duplexing). In the frequency domain context and/or when performing spatial domain multiplexing of UEs (e.g., MU MIMO, etc.), the RAN node 2000 will allocate separate frequency subbands of the carrier to UEs simultaneously served by the RAN node 2000, for uplink and/or downlink transmissions.

In the time domain context, the RAN node 2000 will allocate a carrier (or subbands of the carrier) to one or more UEs (e.g., UE 120, etc.) connected to the RAN node 2000 during designated upload (e.g., uplink (UL)) time periods and designated download (e.g., downlink (DL)) time periods, or during designated special (S) time periods which may be used for UL and/or DL, but the example embodiments are not limited thereto.

When there are multiple UEs connected to the RAN node 2000, the carrier is shared in frequency and/or time such that each UE is scheduled by the RAN node 2000, and the RAN node 2000 allocates each UE with their own uplink frequency and/or time and/or downlink frequency and/or time. Data transmission between the UE and the RAN node 2000 may occur on a radio frame basis in both the frequency domain and time domain contexts. The minimum resource unit for allocation and/or assignment by the RAN node 2000 to a particular UE device corresponds to a specific downlink/uplink resource block (e.g., twelve adjacent subcarriers, a frequency subband, etc.), but the example embodiments not limited thereto.

For the sake of clarity and consistency, the example embodiments will be described as using the frequency domain, but the example embodiments are not limited thereto.

Additionally, according to at least one example embodiment, the RAN node 2000 may transmit system information to the one or more UE devices located within the cell servicing area of the RAN node 2000, which may be used by the one or more UE devices to access the wireless network. For example, the RAN node 2000 may periodically broadcast a synchronization signal block (SSB), physical broadcast channel (PBCH) block, and/or a master information block (MIB) to the one or more UE devices located within the corresponding cell servicing area, e.g., cell servicing area 110*a*. The system information, e.g., the SSB, PBCH, and/or MIB blocks, etc., may include information regarding system parameters for use in cell discovery, establish frame synchronization, information used to enable reception of system information, etc. The UE device may then use the information included in the SSB, PBCH, and/or MIB to identify the subcarrier spacing used by the RAN node 2000 for various control and/or data channels, such as information related to a physical downlink control channel (PDCCH), information related to a physical uplink control channel (PUCCH), information related to a physical downlink shared channel (PDSCH), etc.

Additionally, the MIB may include information defining a "search space type 0" to be monitored by the UE device to determine monitoring occasions for the PDCCH, such as PDCCH scheduling SIB1, as well as information indicating an initial control resource set (CORESET), e.g., "CORESET #0", which is a set of resources associated with at least index 0 to be used to decode a downlink control information (DCI) transmitted to the UE device via the PDCCH.

The DCI may include information regarding the frequency-domain resource allocation (FDRA) allocated to the UE device for data channel scheduling, modulation and coding schemes, etc. More specifically, the DCI (e.g., SIB1 DCI, a DCI with format 1_0, etc.) may include information related to the scheduling of transmission of system information blocks (SIBs), including the scheduling of an initial SIB type 1 (SIB1), and/or the scheduling of subsequent SIBs (e.g., SIB2, SIB3, SIB4, etc.). The SIBs may include information that is used by the UE device to access the wireless network, including system information, network parameters, etc.

However, the use of legacy broadcast messages, including legacy SIB1, other system information (OSI) scheduling, paging, random access response (RAR), etc., may be inefficient when used with and/or incompatible with reduced baseband bandwidth (RBBBW) REDCAP UE devices. For example, the legacy SIB1 may be relatively large, and therefore RBBBW REDCAP UE devices may have difficulty decoding the legacy SIB1 and/or may be unable to decode the SIB1 due to performance loss from reduced coding gain and/or reduced frequency diversity, since the SIB1 is transmitted over a 20 MHz baseband bandwidth for legacy (e.g., standard) UE devices and/or non-RBBBW REDCAP UE devices, but the RBBBW REDCAP UE device is limited to a 5 MHz baseband bandwidth, but the example embodiments are not limited thereto. Therefore, it is beneficial and/or advantageous for the RAN node 2000 to enhance and/or power-boost the transmission of broadcast messages over PDSCH to REDCAP UE devices in a desired, configured, and/or indicated frequency allocation within the reduced baseband bandwidth assigned to the RBBBW REDCAP UE device and/or to repeat the transmission of the enhanced broadcast message, in comparison with legacy SIB1, etc.

Consequently, the RAN node 2000 may be configured to receive at least one network setting from the core network 100 to RBBBW REDCAP UE devices. For example, the network setting may include settings and/or parameters indicating that the RAN node 2000 will provide support for RBBBW REDCAP UE devices, and/or settings and/or parameters related to a desired, configured, and/or maximum frequency allocation for the RBBBW REDCAP UE device (e.g., 5 MHz, etc.) for unicast PDSCH and PUSCH transmission within the default and/or standard baseband bandwidth allocated to UE devices being served by the RAN node 2000.

Figure 5:
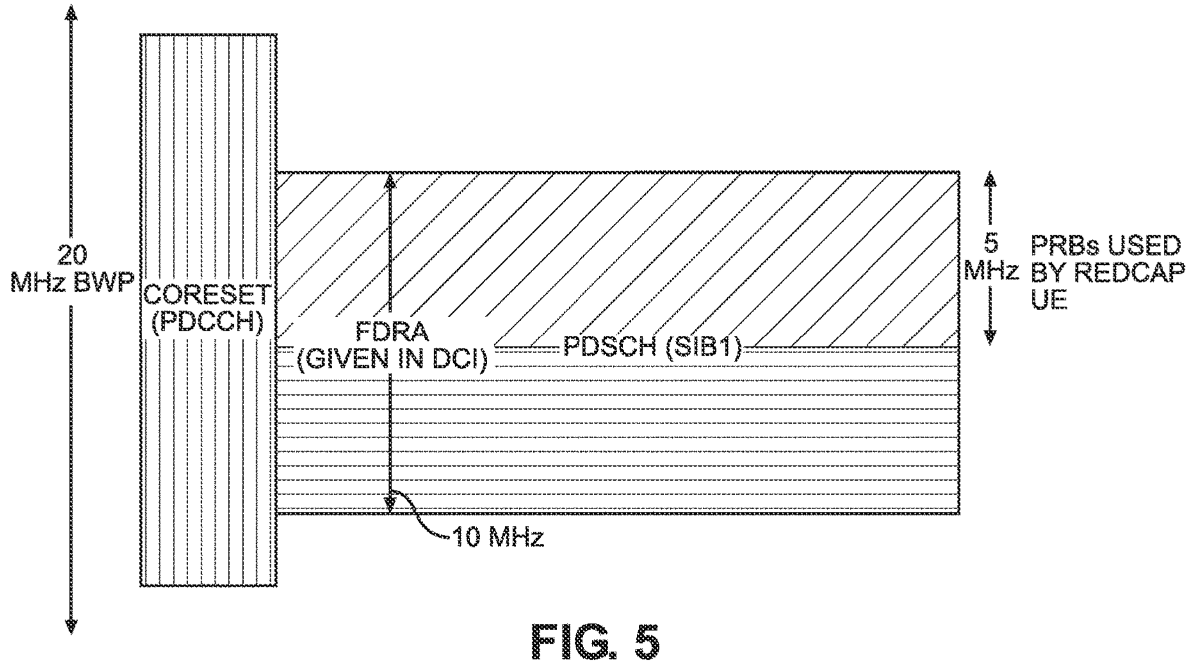
FIG. 5 illustrates an example message transmitted to a REDCAP UE device according to at least one example embodiment.

Referring now to FIG. 5, FIG. 5 illustrates an example message transmitted to a REDCAP UE device according to at least one example embodiment, but the example embodiments are not limited thereto. As shown in FIG. 5, and as will be assumed throughout the present specification, a RBBBW REDCAP UE devices may be assigned and/or allocated with 20 MHz bandwidth part (BWP) for UL and/or DL transmission, and 5 MHz of baseband bandwidth for PDSCH (both unicast and broadcast messages) and PUSCH, but the example embodiments are not limited thereto and other values may be allocated. Additionally, it is assumed that some broadcast PDSCH messages, such as SIB1, OSI, etc., are larger than the 5 MHz baseband bandwidth allocated to the RBBBW REDCAP UE device, etc. As shown in FIG. 5, it is assumed that the broadcast PDSCH messages are allocated to 10 MHz of PRBs, but the example embodiments are not limited thereto.

Referring again to FIG. 2, according to some example embodiments, the network settings may also include settings and/or parameters related to providing enhanced and/or power-boosted PRBs within the default and/or standard baseband bandwidth for multicast or broadcast PDSCH transmissions (e.g., SIB1, OSI scheduling, paging, RAR, etc.), and/or settings and/or parameters indicating that transmission of the enhanced and/or power-boosted PRBs should be repeated a desired and/or configured number of times, etc., but the example embodiments are not limited thereto.

Additionally, according to some example embodiments, the RBBBW REDCAP network settings may indicate a cyclic redundancy check (CRC) scrambling setting associated with DCI signaling on the network. The CRC scrambling setting may cause the RAN node 2000 to perform CRC scrambling on DCI using a desired type of radio network temporary identifier (RNTI), such as system information (SI)-RNTI, paging (P)-RNTI, random access (RA)-RNTI, multimedia broadcast multicast service (MBMS) point-to-multipoint control channel (MCCH)-RNTI, group (G)-RNTI, etc., but the example embodiments are not limited thereto.

Further, according to some example embodiments, the RBBBW REDCAP network settings may indicate to the RAN node 2000 whether to enhance and/or power-boost the transmission power of demodulation reference signals (DMRS) and/or PDSCH transmission within a desired frequency domain resource set (FDRS) region, but the example embodiments are not limited thereto.

Additionally, in order to support the enhanced message transmission to RBBBW REDCAP UE devices, the RAN node 2000 may be configured to transmit system information (e.g., SIB1 block, other system information and/or MIB, etc.) which indicates the desired FDRS region allocated to the RBBBW REDCAP UE device(s). For example, the RAN node 2000 may transmit SIB1 signaling to the RBBBW REDCAP UE device including an indication of the desired FDRS, the desired FDRS indicating a set of PRBs allocated for enhancement by the RAN node 2000 (e.g., transmission power boosting and/or repetition of transmission of the set of enhanced PRBs, etc.). Additionally, the RAN node 2000 may include the FDRS indication in the MIB, which indicates a starting PRB of the set of enhanced PRBs (e.g., a starting offset) in relation to a CORESET #0 configuration of the RBBBW REDCAP UE device, thereby allowing the RBBBW REDCAP UE device to determine and/or identify the set of enhanced PRBs.

Further, the FDRS indication may also indicate whether the enhanced PRBs are fixed with respect to the allocated system bandwidth (e.g., the allocated baseband bandwidth of the RBBBW REDCAP UE device), fixed with respect to the frequency-domain resource allocation given in the DCI, time varying based on a desired, configured, and/or indicated frequency hopping pattern, and/or the length (e.g., the number) of enhanced PRBs are fixed for each subcarrier spacing (SCS) assigned to the RBBBW REDCAP UE device, etc., but the example embodiments are not limited thereto.

The RBBBW REDCAP UE device system information transmission methods according to some example embodiments will be discussed in further detail in connection with FIGS. 4 to 6D.

The RAN node 2000 may also include at least one core network interface 2400, and/or at least one wireless antenna array 2500, etc. The at least one wireless antenna array 2500 may include an associated array of radio units (not shown) and may be used to transmit the wireless signals in accordance with a radio access technology, such as 4G LTE wireless signals, 5G NR wireless signals, etc., to at least one UE device, such as UE 120, etc. According to some example embodiments, the wireless antenna array 2500 may be a single antenna, or may be a plurality of antennas, etc. For example, the wireless antenna array 2500 may be configured as a grid of beams (GoB) which transmits a plurality of beams in different directions, angles, frequencies, and/or with different delays, etc., but the example embodiments are not limited thereto.

The RAN node 2000 may communicate with a core network (e.g., backend network, backhaul network, backbone network, Data Network, etc.) of the wireless communication network via a core network interface 2400. The core network interface 2400 may be a wired and/or wireless network interface and may enable the RAN node 2000 to communicate and/or transmit data to and from to network devices on the backend network, such as a core network gateway (not shown), a Data Network (e.g., Data Network 105), such as the Internet, intranets, wide area networks, telephone networks, VoIP networks, etc.

While FIG. 2 depicts an example embodiment of a RAN node 2000, the RAN node is not limited thereto, and may include additional and/or alternative architectures that may be suitable for the purposes demonstrated. For example, the functionality of the RAN node 2000 may be divided among a plurality of physical, logical, and/or virtual network elements, such as a centralized unit (CU), a distributed unit (DU), a remote radio head (RRH), and/or a remote radio unit (RRU), etc. Additionally, the RAN node 2000 may operate in standalone (SA) mode and/or non-standalone (NSA) mode using interfaces (not shown) such as X2, Xn, etc., between the RAN node 2000 and other RAN nodes of the wireless network, interfaces, such as S1, NG, etc., between the RAN node 2000 and the core network (e.g., core network 100), interfaces between network functions of the RAN node 2000 operating in a distributed and/or virtual RAN mode (not shown), such as F1, E1, etc., and/or interfaces between the physical layer (e.g., a baseband unit, etc.) and the radio layer (e.g., a RRH, core network interface 2400, etc.) (not shown), such as CPRI, eCPRI, etc., but the example embodiments are not limited thereto.

Figure 3:
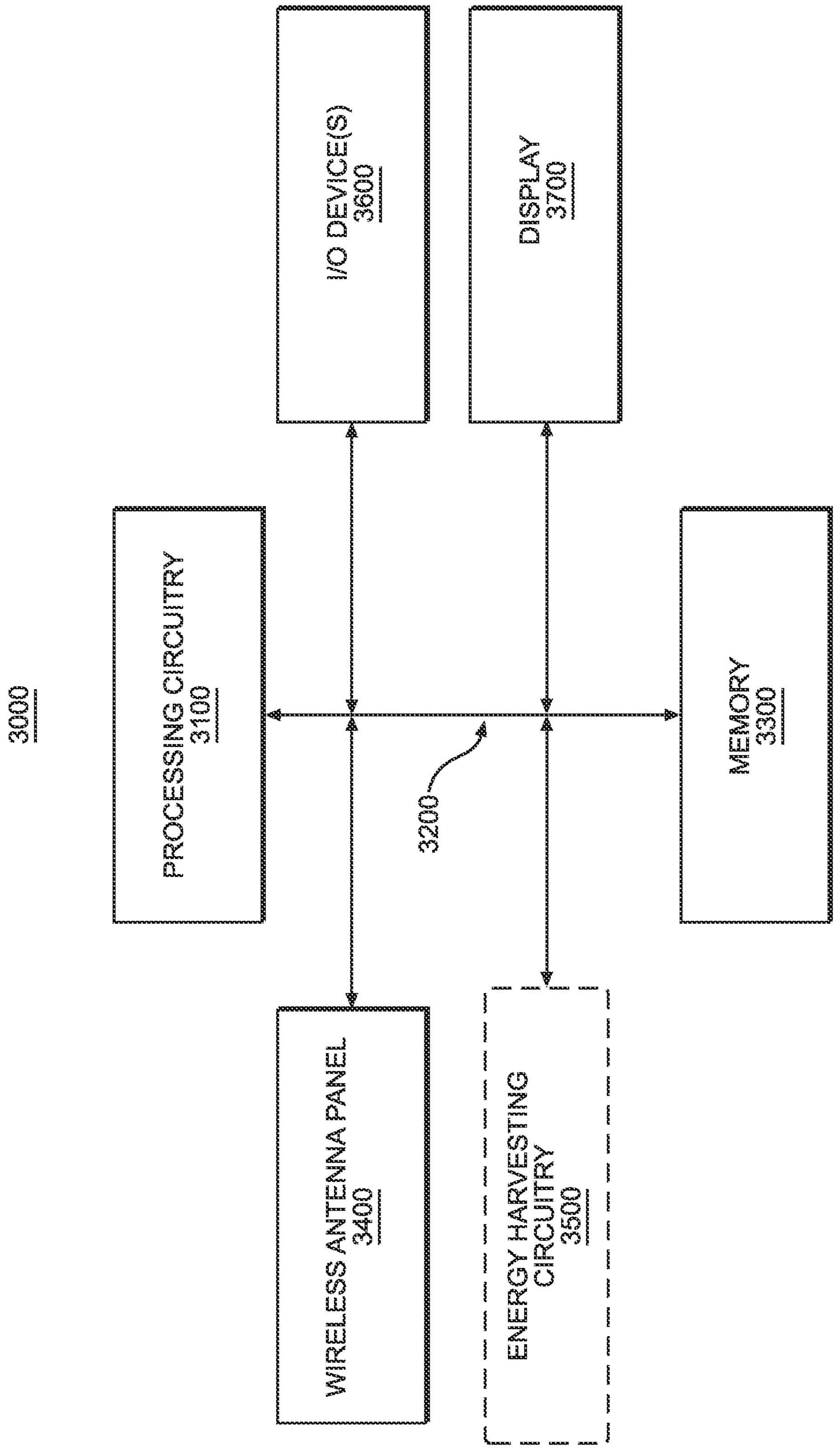
FIG. 3 illustrates a block diagram of an example REDCAP UE device according to at least one example embodiment.

FIG. 3 illustrates a block diagram of an example UE device according to at least one example embodiment. The example UE device 3000 of FIG. 3 may correspond to one or more of the UE devices 120 and 130 of FIG. 1, but the example embodiments are not limited thereto, and the UE devices may employ alternative architectures, etc.

Referring to FIG. 3, a UE 3000 may be a REDCAP UE device and may include processing circuitry 3100, such as at least one processor, at least one communication bus 3200, a memory 3300, a plurality of wireless antennas and/or wireless antenna panels 3400, at least one input/output (I/O) device 3700 (e.g., a keyboard, a touchscreen, a mouse, a microphone, a camera, a speaker, etc.), and/or a display panel 3800 (e.g., a monitor, a touchscreen, etc.), but the example embodiments are not limited thereto. According to some example embodiments, the UE 3000 may include a greater or lesser number of constituent components, and for example, the UE 3000 may also include at least one energy harvesting device 3500, such as one or more solar cells/panels, wind turbines, water turbines, heat pumps, geothermal heat pumps, kinetic energy harvesting devices and/or vibration harvesting devices, radio frequency harvesting devices, etc., at least one battery 3600 (e.g., an energy storage device, etc.), etc., but the example embodiments are not limited thereto. Additionally, the UE 3000 may further include one or more proximity sensors (e.g., an infra-red proximity sensor, a capacitive proximity sensor, etc.), one or more location sensors (e.g., GPS, GLONASS, Beidou, Galileo, etc.), other sensors (e.g., thermometers, humidity sensors, pressure sensors, motion sensors, accelerometers, etc.), actuators, a single wireless antenna and/or a single wireless antenna panel, etc. Additionally, the display panel 3800, and/or I/O device 3700, etc., of UE 3000 may be optional.

In at least one example embodiment, the processing circuitry 3100 may include at least one processor (and/or processor cores, distributed processors, networked processors, etc.), such as the at least one processor, which may be configured to control one or more elements of the UE 3000, and thereby cause the UE 3000 to perform various operations. The processing circuitry 3100 is configured to execute processes by retrieving program code (e.g., computer readable instructions) and data from the memory 3300 to process them, thereby executing special purpose control and functions of the entire UE 3000. Once the special purpose program instructions are loaded into the processing circuitry (e.g., the at least one processor 3100, etc.), the at least one processor 3100 executes the special purpose program instructions, thereby transforming the at least one processor 3100 into a special purpose processor.

In at least one example embodiment, the memory 3300 may be a non-transitory computer-readable storage medium and may include a random access memory (RAM), a read only memory (ROM), and/or a permanent mass storage device such as a disk drive, or a solid state drive. Stored in the memory 3300 is program code (i.e., computer readable instructions) related to operating the UE 3000, such as the methods discussed in connection with FIGS. 4 to 6D, etc. Such software elements may be loaded from a non-transitory computer-readable storage medium independent of the memory 3300, using a drive mechanism (not shown) connected to the UE 3000, or via the wireless antenna 3400, etc. Additionally, the memory 3300 may store network configuration information, such as system information, resource block scheduling, etc., for communicating with at least one RAN node, e.g., RAN node 110, etc., accessing a wireless network, etc., but the example embodiments are not limited thereto.

In at least one example embodiment, the at least one communication bus 3200 may enable communication and data transmission/reception to be performed between elements of the UE 3000, and/or monitor the status of the elements of the UE 3000 (e.g., monitor the current battery level of the battery 3600, monitor whether the energy harvesting device 3500 is currently active (e.g., harvesting and/or collecting energy) or currently inactive (e.g., not collecting energy), etc. The bus 3200 may be implemented using a high-speed serial bus, a parallel bus, and/or any other appropriate communication technology. According to at least one example embodiment, the UE 3000 may include a plurality of communication buses (not shown), such as an address bus, a data bus, etc.

The UE 3000 may also include at least one wireless antenna panel 3400, but is not limited thereto. The at least one wireless antenna panel 3400 may include at least one associated radio unit (not shown) and may be used to transmit wireless signals in accordance with at least one desired radio access technology, such as 4G LTE, 5G NR, Wi-Fi, etc. Additionally, the at least one wireless antenna panel 3400 may be configured to transmit and/or receive data communications, etc., but the example embodiments are not limited thereto. The at least one wireless antenna panel 3400 may be located at the same or different physical locations on the body of the UE 3000, may have the same or different orientations, may operate in the same or different frequency ranges, may operate in accordance with the same or different radio access technology, etc. According to some example embodiments, the at least one wireless antenna panel 3400 may be a single antenna, or may be a plurality of antennas, etc.

While FIG. 3 depicts an example embodiment of a UE 3000, the UE device is not limited thereto, and may include additional and/or alternative architectures that may be suitable for the purposes demonstrated.

Figure 4:
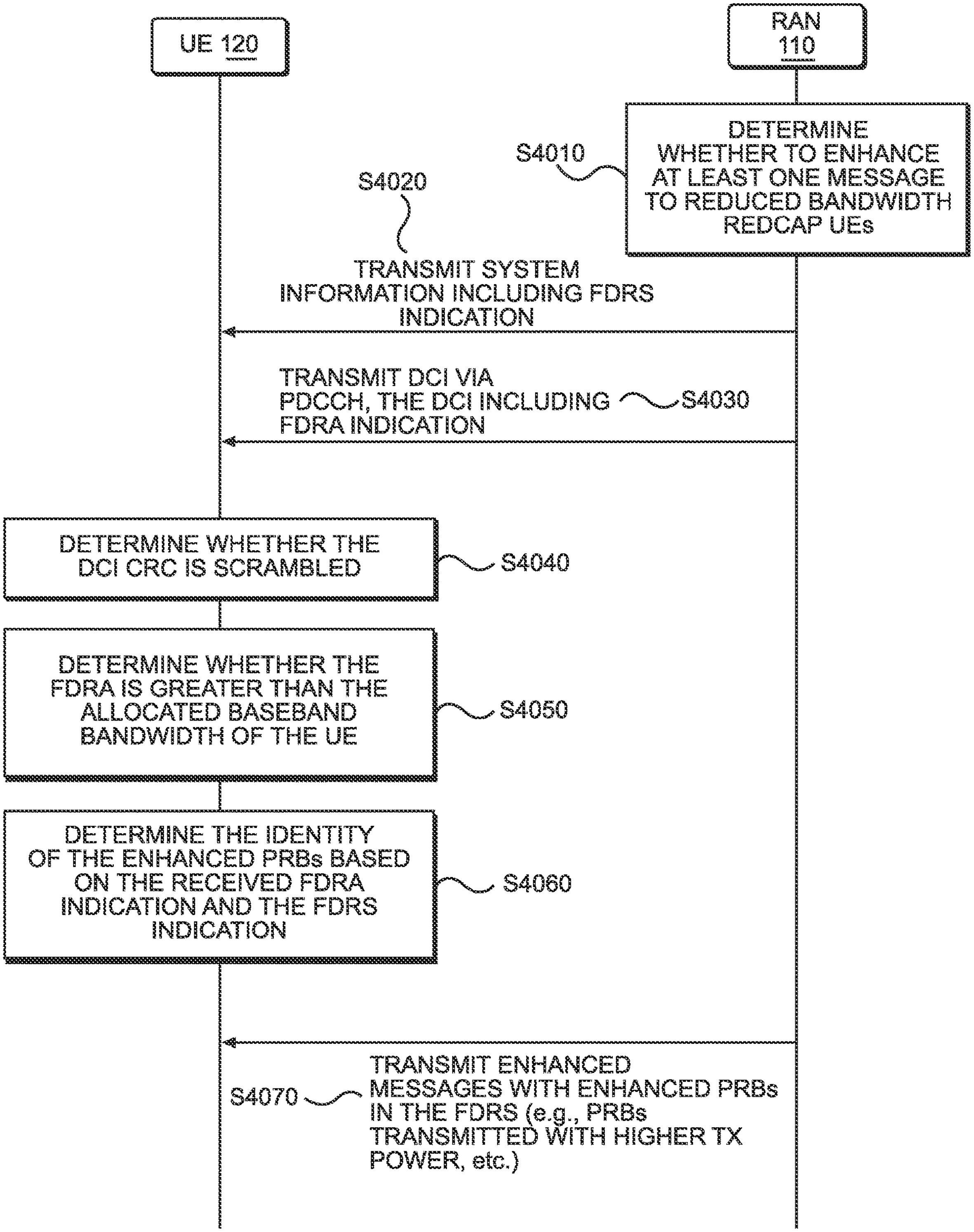
FIG. 4 illustrates an example transmission flow diagram between at least one REDCAP UE device and at least one RAN node according to at least one example embodiment.

FIG. 4 illustrates an example transmission flow diagram between at least one REDCAP UE device and at least one RAN node according to at least one example embodiment. FIGS. 6A to 6D illustrate various examples of enhanced messages transmitted to a REDCAP UE device according to some example embodiments.

As shown in FIG. 4, according to at least one example embodiment, a UE device, such as UE device 120, etc., may be a RBBBW REDCAP UE device, but is not limited thereto.

According to at least one example embodiment, in operation S4010, a RAN node, such as RAN node 110 of FIG. 1, etc., may determine whether to enhance at least one message to UE device 120 based on a network setting (e.g., an enhancement network setting, a power-boost network setting, a RBBBW network setting, a REDCAP network setting, etc.). The network setting may indicate to the RAN node 110 that a desired set of PRBs of the message are to be power-boosted, e.g., the transmission power level of the desired set of enhanced PRBs is to be increased by a desired amount over the transmission power level of non-enhanced PRBs, etc. Further, the network settings may indicate the desired amount of power-boosting for the enhanced PRBs and/or whether transmission of the enhanced PRBs are to be repeated a desired number of times, but the example embodiments are not limited thereto.

In operation S4020, the RAN node 110 may transmit system information the UE 120. The system information may include a desired frequency domain resource set (FDRS) indication and/or allocation, but is not limited thereto. For example, the FDRS indicates the plurality of enhanced PRBs allocated to the UE device 120. Additionally, according to some example embodiments, the FDRS may also indicate whether the set of enhanced PRBs are to be fixed with respect to the system bandwidth, fixed with respect to a frequency domain resource allocation for the UE device given in DCI, time varying based on a desired, configured, and/or indicated frequency hopping pattern, etc. Additionally, the FDRS may indicate whether the length (e.g., the number) of enhanced PRBs are fixed for each subcarrier spacing (SCS) assigned to the UE device, etc., but the example embodiments are not limited thereto.

According to some example embodiments, the system information may be a transmitted SSB with a MIB including the FDRS indication, but the example embodiments are not limited thereto, and for example, the system information may be a SIB1 including the FDRS indication, etc.

In operation S4030, the RAN node 110 may transmit DCI to the UE device 120 via PDCCH, the DCI including a frequency domain resource allocation (FDRA) indication. Referring now to FIG. 5, the FDRA indication may represent the bandwidth (e.g., the PRBs) allocated for broadcast PDSCH transmissions (e.g., SIB1, OSI, paging, RAR, etc.), and for example, may be 10 MHz as shown in FIG. 5, but the example embodiments are not limited thereto, and other FDRA values may be used.

In operation S4040, the UE 120 may determine whether the DCI CRC has been scrambled. For example, the UE 120 may determine whether the DCI CRC has been scrambled using system information (SI)-RNTI, paging (P)-RNTI, random access (RA)-RNTI, multimedia broadcast multicast service (MBMS) point-to-multipoint control channel (MCCH)-RNTI, group (G)-RNTI, etc., but the example embodiments are not limited thereto. Based on the results of the determination, the UE 120 may identify the types of messages transmitted by the RAN node 110 which will be enhanced and/or power-boosted. Additionally, in operation S4050, the UE 120 may determine whether the FDRA indicated in the DCI is greater than the allocated baseband bandwidth of the UE. In other words, assuming that the allocated baseband bandwidth of the UE 120 is 5 MHz (as shown in FIG. 5), the UE 120 may determine whether the bandwidth allocated to the FDRA is greater than 5 MHz, but the example embodiments are not limited thereto.

According to some example embodiments, assuming that the results of operation S4050 show that the FDRA is greater than the baseband bandwidth allocated to the UE 120, in operation S4060, the UE 120 determines the identity of the enhanced PRBs to be transmitted in the determined types of messages to be enhanced and/or power-boosted (e.g., the results of operation S4040) based on the received FDRA indication and the received FDRS indication. For example, the UE 120 may perform an AND operation on the set of PRBs indicated in the FDRA and the set of PRBs indicated in the FDRS to determine the set of enhanced PRBs which will be enhanced and/or power-boosted by the RAN node 110.

In operation S4070, the RAN node 110 may transmit the one or more enhanced messages including enhanced PRBs as indicated in the FDRS. According to some example embodiments, the enhanced PRBs may be transmitted using an increased transmission power level (e.g., power-boosted) in comparison to PRBs which are not indicated in the FDRS, but the example embodiments are not limited thereto. In other example embodiments, the enhanced PRBs may be transmitted a desired number of additional times, etc. In some example embodiments, the enhanced PRBs may be power-boosted and may be transmitted a desired number of additional times, etc.

Figure 6A:
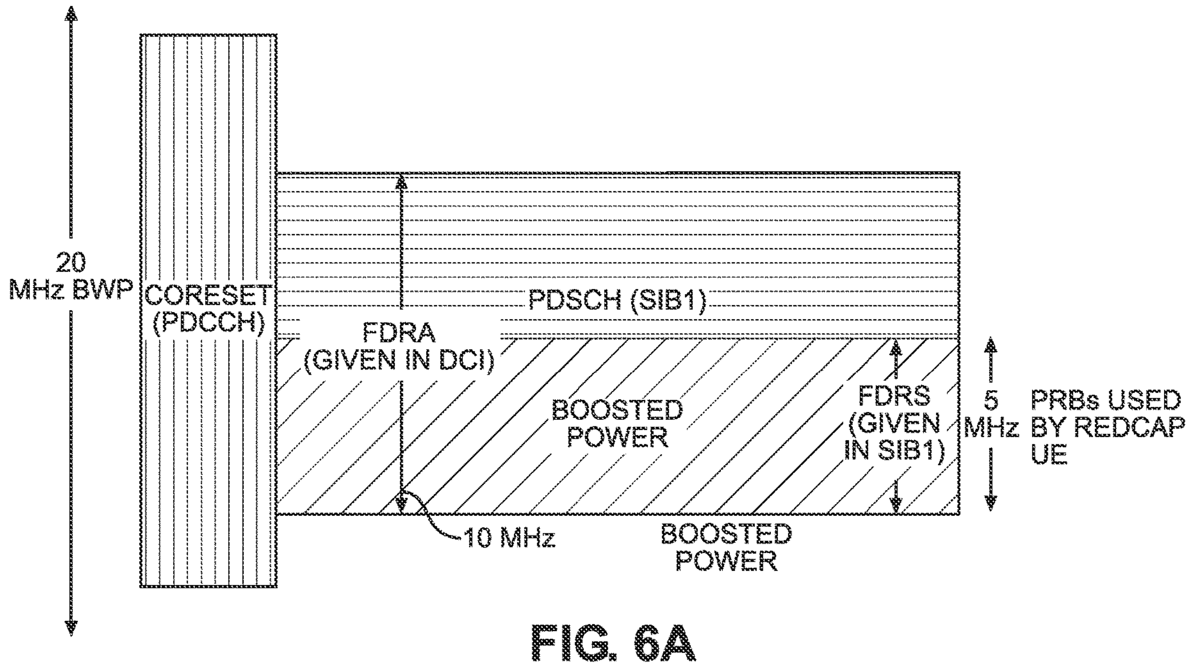
FIGS. 6A to 6D illustrate various examples of enhanced messages transmitted to a REDCAP UE device according to some example embodiments.
Figure 6B:
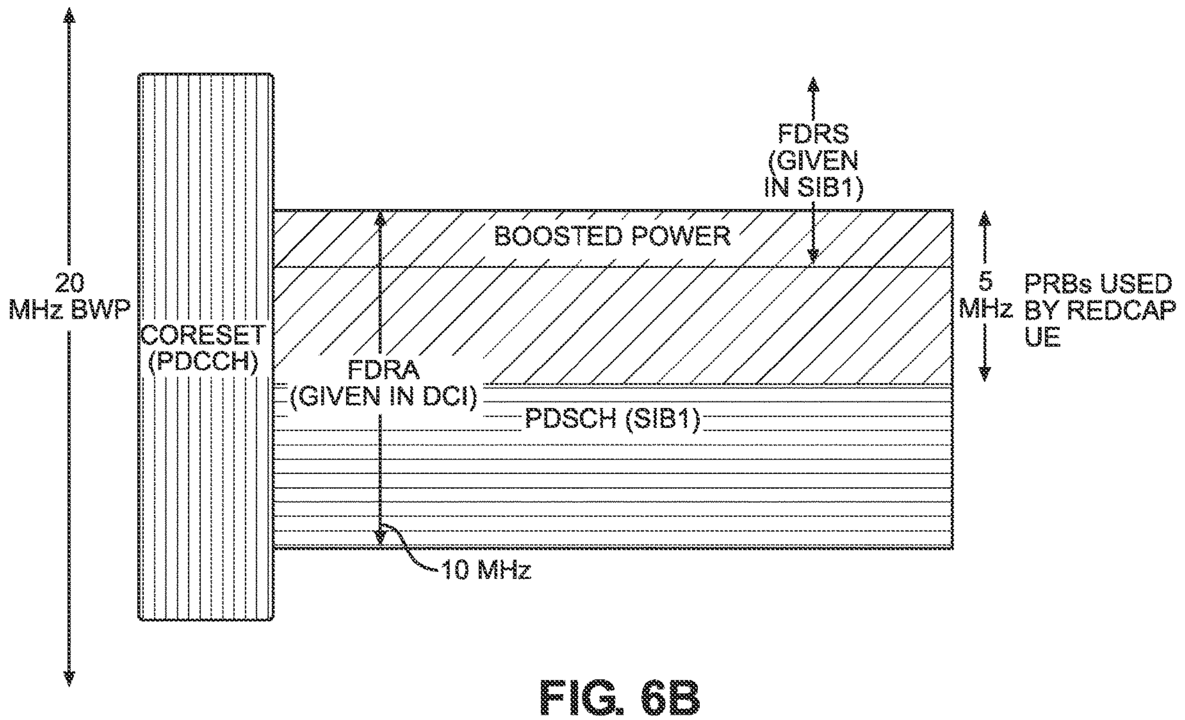

Referring now to FIG. 6A, FIG. 6A shows an instance wherein all of the PRBs indicated in the FDRS is included in the set of PRBs indicated in the FDRA, therefore the UE device may receive all of the enhanced and/or power-boosted PRBs. In contrast, FIG. 6B illustrates an instance where only a subset of PRBs indicated in the FDRS is included in the set of PRBs indicated in the FDRA. Accordingly, the UE device does not receive all of the enhanced and/or power-boosted PRBs transmitted by the RAN node 110, and may receive some PRBs which are not enhanced and/or power-boosted, etc.

Figure 6C:
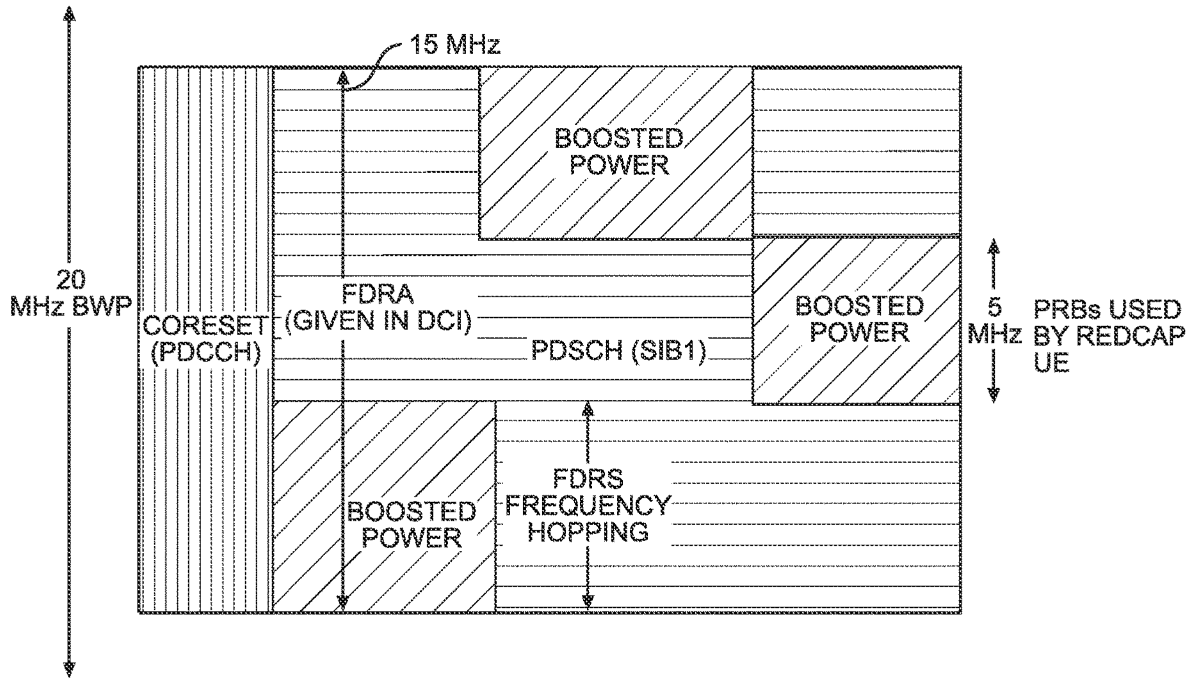

Further, as shown in FIG. 6C, the FDRS indication may also indicate that the enhanced PRBs will frequency hop (and/or vary in time) based on a desired frequency hopping pattern. Accordingly, the UE 120 may listen for and/or receive the enhanced PRBs of the message transmitted by the RAN node 110 based on the desired frequency hopping pattern.

Figure 6D:
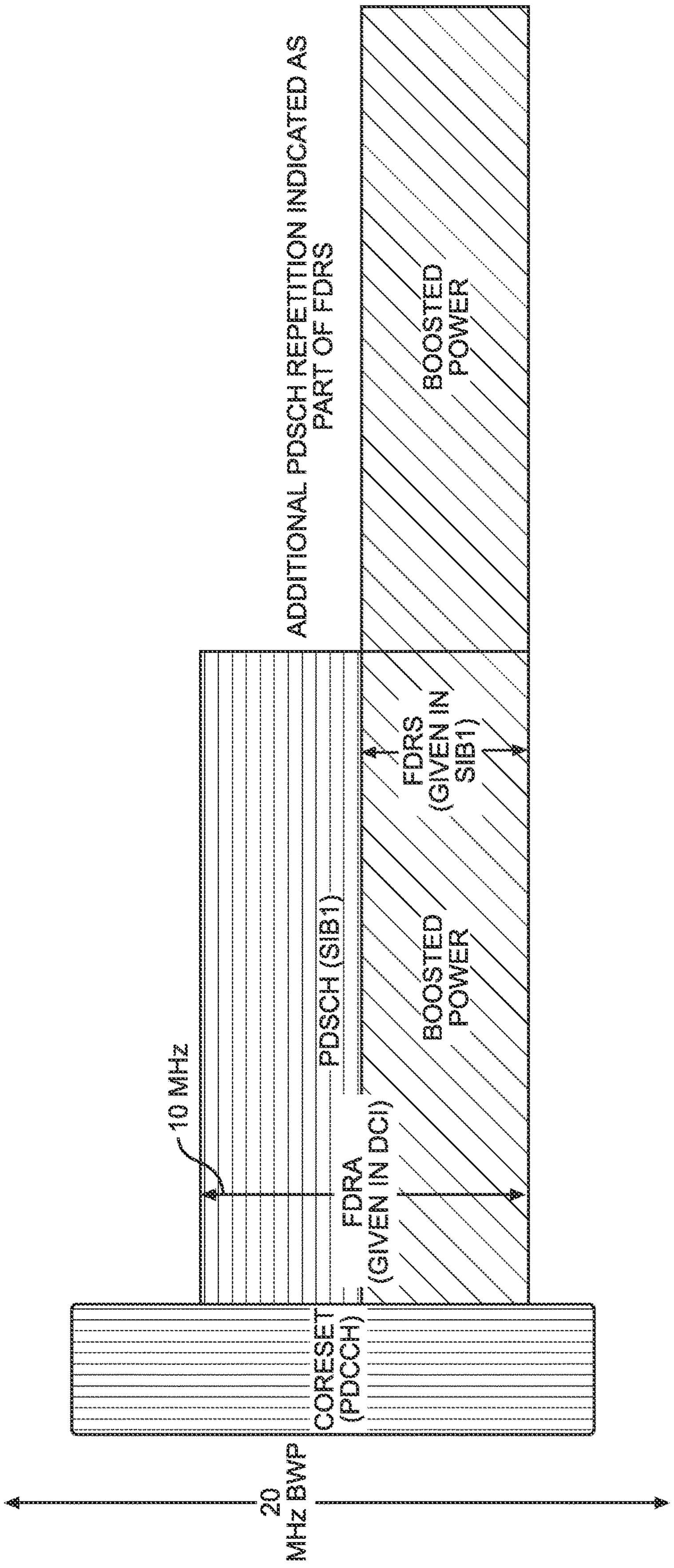

Additionally, as shown in FIG. 6D, the FDRS indication may also indicate that the enhanced PRBs of the message transmitted by the RAN node 110 will be repeated a desired number of times.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A radio access network (RAN) node comprising:

a memory storing computer readable instructions; and processing circuitry configured to execute the computer readable instructions to cause the node to, determine whether to provide enhanced messages to at least one reduced capability (REDCAP) user equipment (UE) device via at least one enhanced physical resource block (PRB) based on a network setting, the at least one REDCAP UE device having a reduced baseband bandwidth in comparison to a baseband bandwidth of a non-REDCAP UE device on a network corresponding to the RAN node;

provide a resource set indication to the at least one REDCAP UE device based on results of the determining, the resource set indication indicating a set of physical resource blocks which are to be enhanced;

transmit downlink control information (DCI) to the at least one REDCAP UE device, the DCI including a frequency domain resource allocation indication indicating a plurality of physical resource blocks assigned to at least one desired message; and transmit the at least one desired message to the at least one REDCAP UE device based on the frequency domain resource allocation indication.

2. The node of claim 1, wherein the network setting indicates that the RAN node supports REDCAP UE devices with the reduced baseband bandwidth.

3. The node of claim 1, wherein the network setting indicates that the RAN node is to increase a transmission power of the set of the plurality of the physical resource blocks which are to be enhanced by a desired boosted transmission power level.

4. The node of claim 1, wherein the node is further caused to transmit the at least one desired message to the at least one REDCAP UE device by:

transmitting, at a first transmission power level, a plurality of physical resource blocks included in both the set of the plurality of the physical resource blocks which are to be enhanced and the plurality of physical resource blocks assigned to the at least one desired message; and transmitting, at a second transmission power level, a remaining subset of the plurality of physical resource blocks assigned to the at least one desired message, the first transmission power level being higher than the second transmission power level by an amount corresponding to the desired boosted transmission power level.

5. The node of claim 1, wherein the node is further caused to:

transmit system information to the at least one REDCAP UE device, the system information including the resource set indication.

6. The node of claim 1, wherein the set of the plurality of the physical resource blocks which are to be enhanced are:

fixed with respect to a system bandwidth; or fixed with respect to the plurality of physical resource blocks assigned to the at least one desired message.

7. The node of claim 1, wherein the set of the plurality of physical resource blocks which are to be enhanced vary in time based on a desired frequency hopping pattern.

8. The node of claim 1, wherein the node is further caused to:

repeat transmission of set of the plurality of the physical resource blocks which are to be enhanced to the at least one REDCAP UE device.

9. The node of claim 1, wherein the node is further caused to:

perform scrambling on a cyclic redundancy check of the DCI using at least one of system information (SI)-radio network temporary identifier (RNTI), paging (P)-RNTI, random access (RA)-RNTI, or any combinations thereof.

10. A reduced capability (REDCAP) user equipment (UE) device comprising:

a memory storing computer readable instructions; and processing circuitry configured to execute the computer readable instructions to cause the device to, obtain a resource set indication from a radio access network (RAN) node, the resource set indication indicating a set of physical resource blocks which are to be enhanced for REDCAP UE devices with a reduced baseband bandwidth in comparison to a baseband bandwidth of a non-REDCAP UE device on a network corresponding to the RAN node;

receive downlink control information (DCI) from the RAN node, the DCI including a frequency domain resource allocation indication indicating a plurality of physical resource blocks assigned to at least one desired message to be transmitted by the RAN node; and receive the at least one desired message from the RAN node based on the resource set indication and the frequency domain resource allocation indication.

11. The device of claim 10, wherein a transmission power level of the set of the plurality of the physical resource blocks which are to be enhanced is increased by a desired boosted transmission power level by the RAN node.

12. The device of claim 10, wherein the device is further caused to:

determine an identity of the enhanced physical resource blocks by performing an AND operation on the resource set indication and the frequency domain resource allocation indication.

13. The device of claim 10, wherein the device is further caused to:

receive system information from the RAN node, the system information including the resource set indication.

14. The device of claim 10, wherein the set of the plurality of the physical resource blocks which are to be enhanced are:

fixed with respect to a system bandwidth; or fixed with respect to the plurality of physical resource blocks assigned to the at least one desired message.

15. The device of claim 10, wherein the set of the plurality of the physical resource blocks which are to be enhanced vary in time based on a desired frequency hopping pattern.

16. The device of claim 10, wherein the device is further caused to:

receive a repeated transmission of the set of the plurality of the physical resource blocks which are to be enhanced from the RAN node.

17. The device of claim 10, wherein the device is further caused to:

determine whether a cyclic redundancy check of the DCI is scrambled using at least one of system information (SI)-radio network temporary identifier (RNTI), paging (P)-RNTI, random access (RA)-RNTI, or any combinations thereof.

18. A method of operating a radio access network (RAN) node, the method comprising:

determining whether to provide enhanced messages to at least one reduced capability (REDCAP) user equipment (UE) device via at least one enhanced physical resource block (PRB) based on a network setting, the at least one REDCAP UE device having a reduced baseband bandwidth in comparison to a baseband bandwidth of a non-REDCAP UE device on a network corresponding to the RAN node;

providing a resource set indication to the at least one REDCAP UE device based on results of the determining, the resource set indication indicating a set of physical resource blocks which are to be enhanced;

transmitting downlink control information (DCI) to the at least one REDCAP UE device, the DCI including a frequency domain resource allocation indication indicating a plurality of physical resource blocks assigned to at least one desired message; and transmitting the at least one desired message to the at least one REDCAP UE device based on the frequency domain resource allocation indication.

19. The method of claim 18, wherein the network setting indicates that the RAN node supports REDCAP UE devices with the reduced baseband bandwidth.

20. The method of claim 18, wherein the network setting indicates that the RAN node is to increase a transmission power of the set of the plurality of the physical resource blocks which are to be enhanced by a desired boosted transmission power level.

* * * * *